United States Patent Office 2,981,275
Patented Apr. 25, 1961

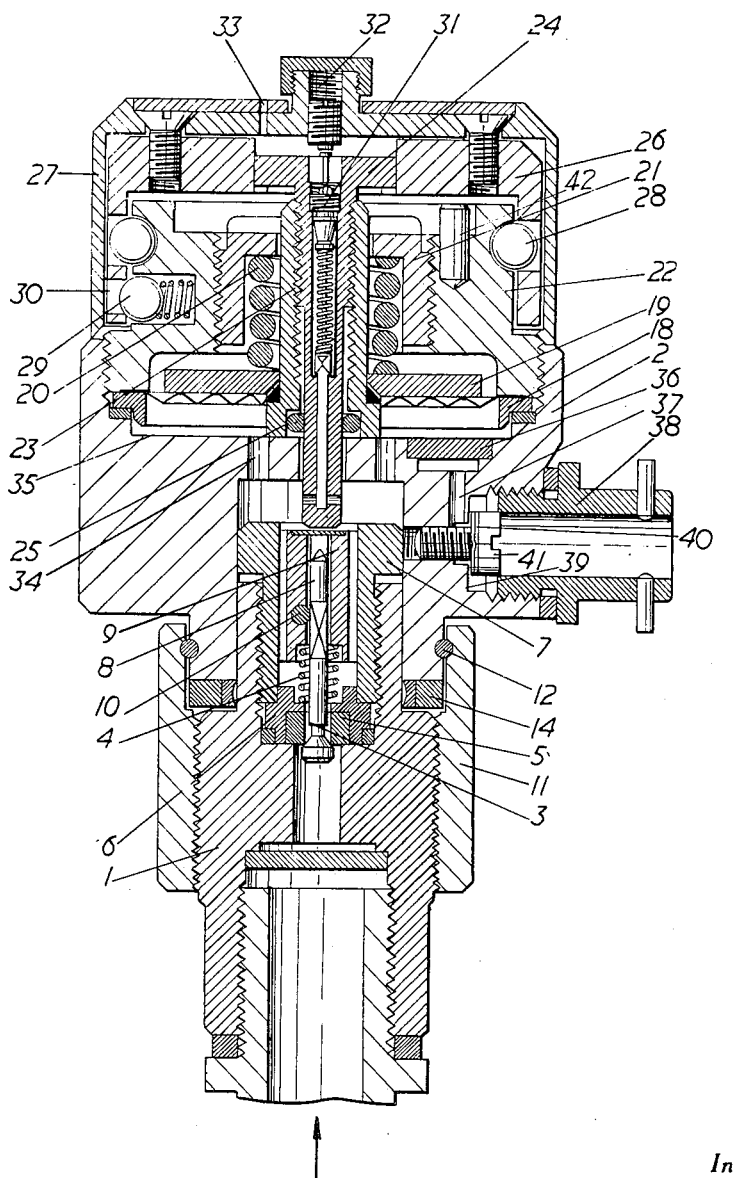

2,981,275

VALVES FOR REDUCING GASEOUS PRESSURE

David Herbert Young, Eastcote, and Laurence Arthur Clay-Smith, Northolt, England, assignors to The Walter Kidde Company Limited, Greenford, England, a British company Filed Jan. 10, 1957, Ser. No. 633,419

Claims priority, application Great Britain Jan. 12, 1956

12 Claims. (Cl. 137—116.5)

The present invention relates to reducing valves for regulating the pressure of gas flowing from a supply source, such as a gas cylinder.

Various constructions of reducing valves are already well-known for regulating the pressure of gas supplied to a more or less constant value. One form of reducing valve is known in which a spring-loaded diaphragm operates to hold the tapered head of a valve member off its seat, the gaseous pressure on the diaphragm acting in opposition to the spring so as to determine the opening between the valve head and its seat and thus control the rate of flow of gas through the valve. Reduction in pressure on the outlet side of the valve due to increased gas demand reduces the force on the diaphragm counteracting the spring, so that the diaphragm moves to increase the valve opening and so perform a regulating action on the outlet gas pressure.

In a reducing valve of this type it has been customary to adjust the outlet pressure for which the valve is regulated by varying the spring loading on the diaphragm.

The object of the present invention is to produce a reducing and regulating valve of a design which permits the adjustment of the outlet pressure to be made very quickly.

The invention makes use of the inherent characteristic of such valves that the force acting on the valve member to move it lengthwise is only a small fraction of the forces acting on the diaphragm and in the reducing valve made in accordance with the present invention the adjustment of the outlet pressure is effected by altering the effective longitudinal spacing between the diaphragm and the valve head.

According to the present invention a reducing valve structure comprises a body, a chamber within the body, a movable member in sealed relation with the walls of the chamber, gas inlet and outlet passages communicating with the chamber on one side of the movable sealing member, spring means biasing the movable sealing member to counteract gas pressures, a valve member located in the gas inlet passage, the valve member being spring biassed towards the movable sealing member and towards a valve seating, a valve control member carried by the movable sealing member adapted to depress the valve member to hold it away from its seating, and means for moving the valve control member longitudinally relative to the movable sealing member. Although the movable sealing member will commonly in practice be a diaphragm, a bellows or a piston is of course the full equivalent of a diaphragm for the present purpose.

It will be appreciated that reduction of pressure in the chamber will cause the diaphragm or other movable sealing member to move towards the valve seat under the influence of its backing spring; thus increasing the valve aperture. There will be a consequent increase of pressure on the outlet side of the valve in the diaphragm chamber to produce a counteracting force on the diaphragm.

The valve control member is most conveniently screw threaded in a collar secured to the diaphragm and it is thus readily movable relative to the diaphragm in an axial direction.

One construction of reducing valve is shown in the accompanying drawing in section.

In the drawing the valve is shown in the shut-off position. The valve is built up in two major assemblies contained respectively in a reducing valve housing 1 and a control diaphragm housing 2, which are screw-threadedly connected to each other.

The valve housing 1 is connected to a high pressure gas supply from either a cylinder or a pipe connection. In the housing 1 there is located a taper-headed valve member 3 which is urged upwardly by a spring 4 against a valve seating washer 5. It will readily be appreciated that in the position shown, the gas pressure forces the head of the valve member 3 against the seating washer 5 and effectively holds the valve in a closed condition.

The valve seating washer 5 is held in a metal bush 6, which is itself clamped firmly into the housing 1 by means of a combined retainer and valve guide 7. The valve member 3 has a screw threaded stem 8 which is threaded into a support member 9. The member 9 is of generally hexagonal shape with rounded corners to enable it to slide freely in the tubular guide 7. The valve member 3 is locked against rotation (and therefore against longitudinal movement) in the support member 9 by means of a lock pin 10, which engages against a flat provided by a squared portion of the stem 8. The exterior shaping of the support member 9 provides the necessary gas passages between it and the valve guide 7.

The opening between the head of the valve member 3 and its seating washer 5 is controlled by the control diaphragm assembly. This assembly is held in the housing 2 to which the housing is secured by means of a captive lock nut 11, held by a wire circlip 12, the housing 1 seating against a sealing washer 14 bonded to the bottom end of the housing 2. A diaphragm assembly 18 is mounted in the housing 2 and is backed by a thrust plate 19 against which the main control spring 20 presses. The spring 20 is backed by an adjusting nut 21, screw threaded into a diaphragm cap nut 22, itself threaded into the housing 20 to secure the diaphragm assembly 18. This arrangement permits a desired initial loading to be applied to the diaphragm 18 through the adjusting nut 21.

The diaphragm 18 has an internally threaded bush 23 secured to it centrally and this bush is freely movable in relation to the cap nut 22 and the adjusting nut 21. The internally threaded bush 23 receives a valve plunger member 24, the space between the plunger member 24 and the bush 23 being sealed by means of an O-ring 25, held in a recess in the bottom end of the bush 23.

The plunger member 24 is rotatable in the bush 23 so as to permit the distance between the bottom end of the plunger member and the diaphragm 18 to be varied. The head end of the plunger member 24 is splined or hexagonal and is engaged in a like recess in a cap member 26. The cap member 26 has an outer cover member 27 secured thereto and is rotatable with respect to the cap nut 22, but is held against longitudinal movement by means of balls 28 located in a groove in the periphery of the cap nut 22.

The cover formed by the members 26 and 27 may be held in a number of positions by a spring-loaded ball 29, which engages in a series of apertures 30 in the cap member 26. The cover is limited to movement through an arc of slightly less than 360° by pin 42 which is abutted by a pin (not shown) depending from member 26 at either end of the arc of movement.

In the present construction a relief valve is provided to vent the diaphragm chamber in the event of an excessive gaseous pressure being imposed on the diaphragm. The relief valve 31 consists of a conventional tyre valve housed in the hollow plunger member 24. The spindle of the valve 31 bears against an adjustable screw 32 in the cover 27, so that the position of the diaphragm at which the relief valve 31 opens can be adjusted. The gas vented from the diaphragm chamber finally escapes through a vent 33.

In the position shown in Figure 1 the reducing valve is shown in the "off" position with the plunger member raised just clear of the top of the valve support member 9 and does not unseat the valve member 3 from the seating washer 5 until the plunger member 24 is screwed down by rotation of the cover. The gas released by the unseating of the valve member then passes up through passages 34 into a space or chamber 35 beneath the diaphragm 18, from whence it passes through a filter 36 into a passage 37 and out through a gas outlet 38.

In passing from the passage 37 to the gas outlet 38 the gas passes through a metering orifice of variable size. The orifice is determined between a seating 39 and a stud 40 by a wavy resilient washer 41, the size of the orifice being varied by tightening or slackening the stud 40. The metering device thus provided is an optional feature of the valve construction.

The gas pressure in the chamber 34 acting on the diaphragm 18 against the spring 20 controls itself in the manner of the conventional reducing valve by governing the effective aperture between the head of the valve member 3 and the seating washer 5.

In order to increase or decrease the gas outlet pressure, the plunger member 24 is rotated in the bush 23 so as to increase or decrease the distance between the top of the member 9 and the diaphragm 18, different and definite pressure setting being defined by the apertures 30. The method of adjustment employed is very light in operation, since the end pressure on the plunger member 24 is quite small. The cover formed by the members 26 and 27 protects the plunger 24 from longitudinal displacement by external forces.

In one modified construction made in accordance with the present invention the diaphragm 18 is replaced by a spring-loaded piston longitudinally movable for a limited travel in sealed relation with the walls of the surrounding housing, all the other parts being the same. The piston is provided with splines or other means to prevent rotation. The plunger member 24 is supported by and is longitudinally adjustable in relation to the piston.

We claim:

1. A reducing valve structure comprising a body having a chamber defined therein, a flexible diaphragm extending across said chamber, said chamber having gas inlet and outlet passages communicating therewith on one side of the diaphragm, an internally threaded member carried by said diaphragm, an abutment in said body on the opposite side of the diaphragm from the gas inlet and outlet passages, a coil spring arranged between said diaphragm and said abutment, a valve control member extending through said internally threaded member and in threaded engagement therewith, a valve member and a valve seat therefor located in the gas inlet passage and co-axial with said valve control member, spring means weaker than said coil spring and biasing said valve member towards a closed position and said valve control member being adapted to hold said valve member away from the closed position, a manually operable rotatable member which is substantially immovable in the axial direction thereof, said manually operable rotatable member being mounted on said body and positioned over the outer end of the valve control member, a sliding coupling means connecting the cover and the valve control member for conjoint rotation to enable the longitudinal position of the valve control member relative to said diaphragm to be adjusted during operation, and means limiting the movement of said manually operable member to less than one complete turn.

2. A reducing valve structure as claimed in claim 1 in which said valve control member has a gas passage formed lengthwise therethrough, said valve structure further comprising a spring-loaded relief valve located in the passage and a fixed formation adjustably mounted on the cover arranged co-axially with the relief valve for unsealing said relief valve in the event of excessive gas pressure being imposed on the diaphragm.

3. A reducing valve structure comprising a body having a chamber therein, a flexible diaphragm extending across said chamber, said chamber having gas inlet and outlet passages communicating therewith on one side of said diaphragm, a valve member and a seat located in the gas inlet passage, said valve member cooperating with said seat to control the flow of gas through said inlet passage, an internally threaded bushing carried by said diaphragm co-axially with said valve member, an abutment member secured in said body and spaced from said diaphragm, said abutment being on the opposite side of said diaphragm from said gas inlet and outlet passages, a coil spring compressed between said abutment member and said bushing to counteract gas pressure on said diaphragm, said abutment member being screw-threaded into said body for initial loading of said coil spring, a valve control member extending through the bushing and in threaded engagement therewith, said valve control member being adapted to vary the position of the valve member in relation to its seat in accordance with the gas pressure on the diaphragm, a manually operable rotatable member which is axially immovable mounted on said body and positioned over the outer end of the valve control member, and a sliding coupling connecting the cover and the valve control member for conjoint rotation for rotating said valve control member for endwise movement thereof relative to said diaphragm during operation of the valve.

4. A reducing valve structure as claimed in claim 3 in which said valve control member has a passage formed lengthwise therethrough, said valve structure further comprising a spring-loaded relief valve located in the passage and a fixed formation adjustably mounted on the cover arranged co-axially with the relief valve.

5. A reducing valve structure as claimed in claim 3, further including means for limiting the rotation of the manually operable member to less than a single turn.

6. A combined flow and pressure regulating control head and housing for use with a gas pressure container which is adapted to be fitted as a closure, a housing equipped with a spring loaded non-return valve, a control head comprising a casing having a chamber therein, a member moveable under gaseous pressure mounted in said chamber dividing said chamber into an upper portion and a lower portion and having a vertical bore extending therethrough, inlet means in said casing, outlet means in said casing, passageway means including said lower chamber portion connecting said inlet means and said outlet means, a spring biasing said member against pressure in the lower chamber portion, travel limiting means adjacent said moveable member in opposition to said spring to limit the travel of said member under the action of said spring, a plunger screw threaded into said vertical bore to be longitudinally adjustably supported by said member and adapted to unseat said non-return valve when said member is moved under the action of said spring, a cover rotatably mounted on said casing and secured thereto against substantial axial motion in relation thereto, said plunger being connected to said cover for rotation therewith and being axially moveable in relation thereto, whereby rotation of said cover moves said plunger vertically with respect to said member.

7. A combined flow and pressure regulating control head and housing according to claim 6, wherein said plunger extends vertically past said moveable member to engage said cover.

8. A combined flow and pressure regulating control head and housing according to claim 6, wherein a spring backing device is adjustably connected to said casing to provide for adjustment of the loading of said spring.

9. A combined flow and pressure regulating control head and housing according to claim 6, wherein said cover comprises an annular portion and a transverse portion, said annular portion being secured to said casing and said transverse portion being connected to said plunger.

10. A combined flow and pressure regulating control head and housing according to claim 9, wherein a plurality of balls engage said casing and said annular portion to rotatably secure said cover to said casing.

11. A combined flow and pressure regulating control head and housing according to claim 9, wherein said annular section is provided with a plurality of circumferentially arranged radial holes and said casing is provided with spring loaded means adapted to engage said holes to hold said cover in any of a number of positions of rotation.

12. A combined flow and pressure regulating control head and housing for use with a gas pressure container which is adapted to be fitted as a closure, a housing equipped with a spring loaded non-return valve, a control head comprising a casing including an upper section and a lower section; a diaphragm clamped between said sections, said lower section having an inlet passageway for receiving pressurized gas from the housing to act on said diaphragm and an outlet passageway for conducting the pressurized gas away from said diaphragm; a spring biasing said diaphragm against the action of the pressurized gas; a boss extending through said diaphragm and connected thereto to move therewith and having a bore therethrough; travel limiting means adjacent said boss to limit the travel of said boss under the action of said spring; a plunger mounted in said bore and threadably engaging said boss for vertical adjustment in relation thereto, said plunger having an end extending downwardly past said boss to engage the non-return valve and having an end extending upwardly past said boss; a cover fitted over said casing including an annular portion and a transverse portion; and a plurality of balls engaging said annular portion and said casing to rotatably mount said cover on said casing and to secure said cover against substantial axial motion in relation to said casing, the upper end of said plunger being connected to said transverse portion for rotation therewith and being axially moveable in relation thereto, whereby rotation of said cover moves said plunger vertically with respect to said diaphragm to operate the non-return valve and control its setting.

References Cited in the file of this patent

UNITED STATES PATENTS

| | | |
|---|---|---|
| 510,635 | Duval | Dec. 12, 1893 |
| 2,089,144 | Work | Aug. 3, 1937 |
| 2,605,077 | Hay | July 29, 1952 |
| 2,615,287 | Senesky | Oct. 28, 1952 |
| 2,731,975 | Boals | Jan. 24, 1956 |
| 2,739,611 | Cornelius | Mar. 27, 1956 |
| 2,819,728 | Gage | Jan. 14, 1958 |
| 2,906,288 | Young | Sept. 29, 1959 |

FOREIGN PATENTS

| | | |
|---|---|---|
| 69,315 | Sweden | Sept. 4, 1925 |
| 65,090 | Denmark | Nov. 4, 1936 |
| 838,628 | France | Dec. 16, 1938 |
| 1,083,517 | France | June 30, 1954 |